(12) United States Patent  
Takeshima et al.

(10) Patent No.: US 7,137,134 B2  
(45) Date of Patent: Nov. 14, 2006

(54) OPTICAL RECORDING MEDIUM HAVING A PRINT RECEIVING LAYER AND PATTERN

(75) Inventors: Hideharu Takeshima, Kanagawa (JP); Mitsugu Wakabayashi, Tokyo (JP)

(73) Assignee: Mitsubishi Kagaku Media Co., Ltd., Tokyo (JP)

( * ) Notice: Subject to any disclaimer, the term of this patent is extended or adjusted under 35 U.S.C. 154(b) by 47 days.

(21) Appl. No.: 10/602,598

(22) Filed: Jun. 25, 2003

(65) Prior Publication Data

US 2004/0085889 A1    May 6, 2004

Related U.S. Application Data

(62) Division of application No. 09/842,139, filed on Apr. 26, 2001, now abandoned.

(30) Foreign Application Priority Data

Apr. 27, 2000  (JP) .............................. 2000-127516  
Jun. 23, 2000  (JP) .............................. 2000-189192

(51) Int. Cl.  
G11B 3/70    (2006.01)  
G11B 5/84    (2006.01)  
G11B 7/26    (2006.01)

(52) U.S. Cl. .................. 720/718; 369/288; 369/283

(58) Field of Classification Search ................ 369/290, 369/283, 286, 288, 280; 720/718  
See application file for complete search history.

(56) References Cited

U.S. PATENT DOCUMENTS

| | | | |
|---|---|---|---|
| 4,920,006 A | 4/1990 | Gillery | |
| 5,013,603 A | 5/1991 | Ogawa et al. | |
| 5,138,604 A | 8/1992 | Umeda et al. | |
| 5,422,226 A | 6/1995 | Aihara et al. | |
| 5,470,691 A | 11/1995 | Arai et al. | |
| 5,492,744 A | 2/1996 | Koike et al. | |
| 5,549,952 A | 8/1996 | Arai et al. | |
| 5,573,831 A | 11/1996 | Suzuki et al. | |
| 5,616,450 A | 4/1997 | Arai et al. | |
| 5,705,247 A | 1/1998 | Arai et al. | |
| 5,920,329 A | 7/1999 | Arai et al. | |
| 5,970,027 A | 10/1999 | Narita et al. | |
| 5,972,457 A | 10/1999 | Matsuishi et al. | |
| 6,001,444 A | 12/1999 | Koide et al. | |
| 6,041,703 A | 3/2000 | Salisbury et al. | |
| 6,084,603 A | 7/2000 | Arai et al. | |
| 6,319,581 B1 | 11/2001 | Tamura | |
| 6,338,889 B1 | 1/2002 | Shibata et al. | |
| 6,437,017 B1 | 8/2002 | Komaki | |

FOREIGN PATENT DOCUMENTS

| | | |
|---|---|---|
| JP | 3-40239 | 2/1991 |
| JP | 8-329530 | 12/1996 |
| JP | 2000-040264 | 2/2000 |
| JP | 2000-40264 | 2/2000 |
| JP | 2000-057635 | 2/2000 |
| WO | WO 97/01845 | 1/1997 |

*Primary Examiner*—Brian E. Miller  
(74) *Attorney, Agent, or Firm*—Oblon, Spivak, McClelland, Maier & Neustadt, P.C.

(57) ABSTRACT

An optical recording medium which comprises a print-receiving layer as the outermost layer on the side opposite to the light incidence side, wherein a pattern is formed on the print-receiving layer.

9 Claims, 5 Drawing Sheets

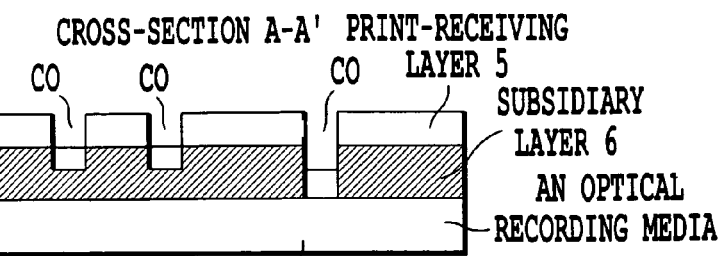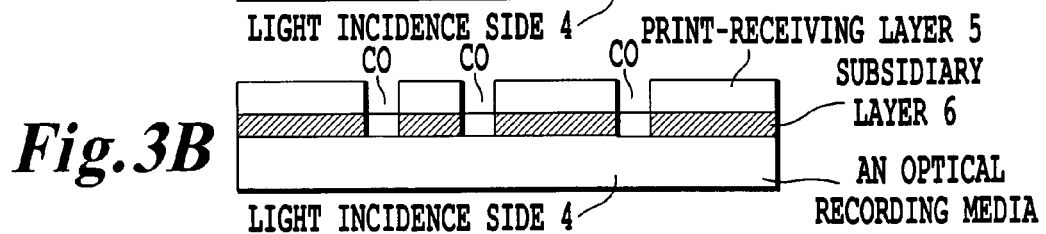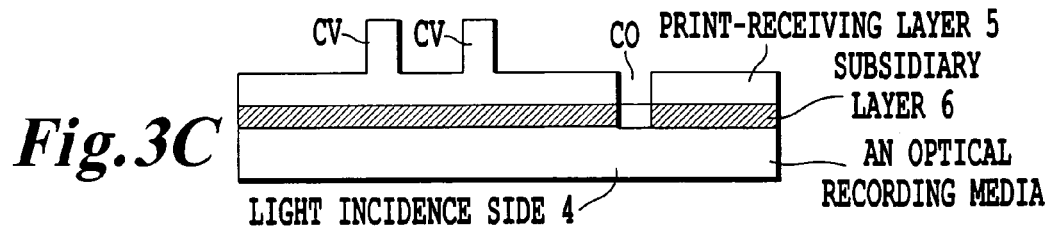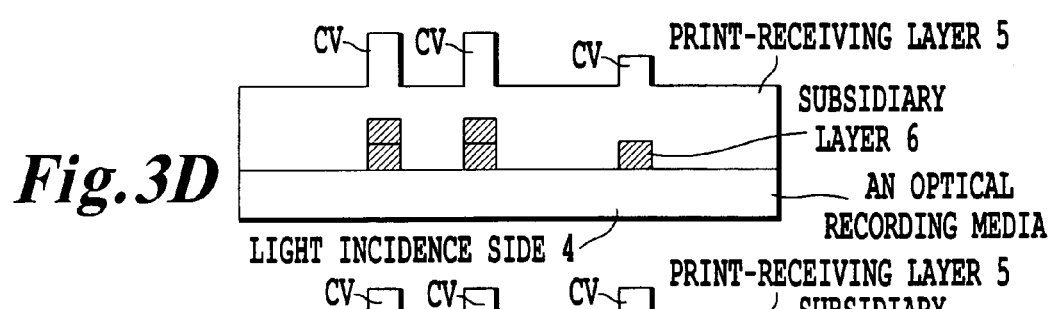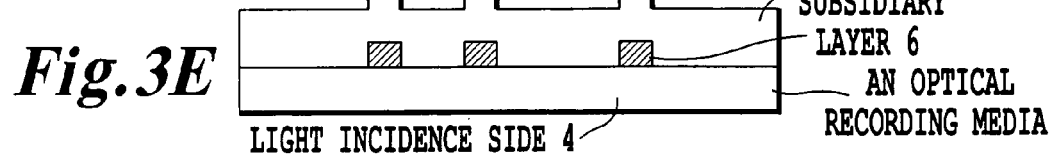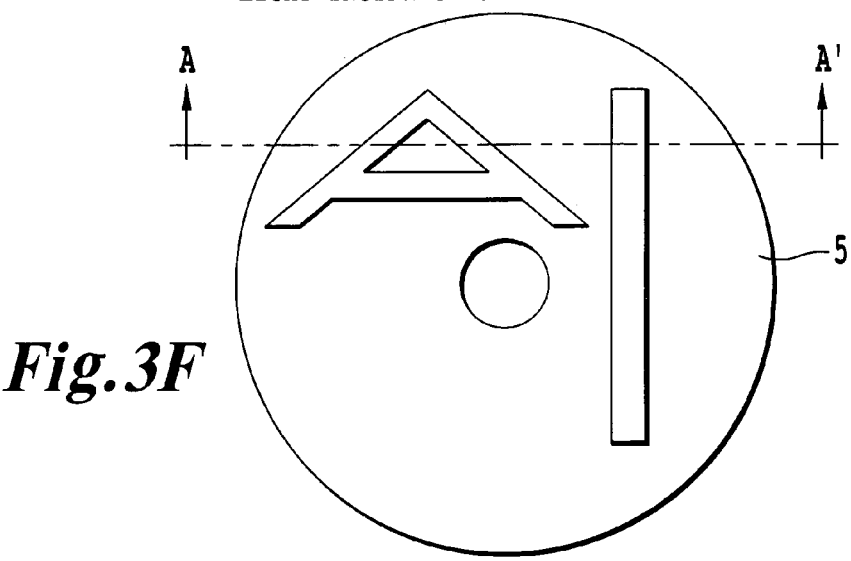

OPTICAL RECORDING MEDIUM HAVING A PRINT RECEIVING LAYER AND PATTERN

This application is a Division of U.S. application Ser. No. 09/842,139, filed on Apr. 26, 2001, now abandoned.

BACKGROUND OF THE INVENTION

1. Field of the Invention

The present invention relates to optical recording media. More particularly, the present invention relates to optical recording media on which various information which is visually recognizable by the naked eye (hereinafter referred to as visual information) can be displayed by any of manufacturers of optical recording media themselves, manufacturers who record various digital information on optical recording media and sell them as optical recording media having digital information recorded thereon, and end consumers purchasing optical recording media themselves or optical recording media having digital information recorded thereon. The present invention further relates to optical recording media on the surface of which various information as visual information is displayed by the manufacturers of the optical recording media themselves, and on which various visual information can further be displayed (written or printed) by the manufacturers who record digital information or the end consumers.

2. Description of the Background

Optical recording media (optical discs) on which digital information can be written and/or read by laser are widely used as recording media in fields of e.g. audio software, computer software, game software and computer-aided publishing, since they have a large recording capacity as compared with conventional recording media and are random access discs.

The optical recording media are classified into two types i.e. a write once type capable of recording and reproducing digital information and a rewritable type capable of erasing recorded digital information and recording new digital information. Among them, CD-Rs (compact disc-recordable: write once type) and CD-RWs (compact disc-rewritable: rewritable type) which are CD system optical recording media, become used widely in recent years. On these CDs, users can write their own digital information or data, and further, CD-Rs are compatible with read only CDs. Further, DVD-Rs (write once type) and DVD-RWs (rewritable type) which are DVD system optical recording media become used widely in recent years.

It is desired for users of such optical recording media that they can tell at a glance what kind of digital information is recorded on each optical recording medium without reproducing recorded digital information. One method is making the surface on the side opposite to the light incidence side of an optical recording medium printable and displaying visual information thereon.

Particularly, manufacturers which record digital information such as music on optical recording media and sell the optical recording media having digital information recorded thereon, desire optical recording media, the surface of which is printable so that what kind of digital information is recorded on the optical recording media is indicated and the commercial value of the optical recording media to be sold is increased. To meet such a demand, optical recording media wherein the surface of the outermost layer on the side opposite to the light incidence side is formed into a print-receiving layer so that said surface is printable, become commercially available in recent years.

Further, printers dedicated to printing on such optical recording media are also commercially available. Many of these printers are of ink jet type using a water base ink or of thermal transfer type. Using such printers, a sharp full color image can be printed at a relatively low cost.

Here, the manufacturers of optical recording media themselves also desire to print e.g. their trademark on optical recording media to be produced so as to label the optical recording media and to increase their commercial value. However, if printing is conducted on the print-receiving layer with a conventional ink by the manufacturers of the media, it is impossible for manufacturers who record digital information on the media and sell them to further conduct printing on the printed surface, and said manufactures have to conduct printing on portions on which no printing is conducted, and printing has to be conducted very restrictedly.

Under these circumstances, it is an object of the present invention to provide an optical recording medium which comprises a surface having visual information already displayed, on the side opposite to the light incidence side, wherein a new visual information can be displayed on said surface. Another object of the present invention is to provide an optical recording medium wherein each of a manufacture of the optical recording medium itself and a manufacture who records digital information on the medium and sell it or an end consumer can display a new visual information on the surface opposite to the light incidence surface of the medium. Another object of the present invention is to provide an optical recording medium which comprises a surface having visual information displayed by a manufacturer of the medium itself, on the side opposite to the light incidence side, wherein a new visual information can further be displayed on said surface by printing by a manufacture who records digital information on the medium and sell it.

Now, the present invention will be described in detail with reference to the preferred embodiments.

BRIEF DESCRIPTION OF THE DRAWING

In the accompanying drawing:

FIG. 3 shows a thickness view of the optical recording medium.

FIG. 3A shows a thickness view of the optical recording medium having at least two types of convexes.

FIG. 3B shows a thickness view of the optical recording medium having convexes.

FIG. 3C shows a thickness view of the optical recording medium having concaves and convexes.

FIG. 3D shows a thickness view of an optical recording medium having a print-receiving layer having different concaves and formed on an optical recording media having a second layer.

FIG. 3E shows a thickness view of an optical recording medium having concaves and formed on an optical recording medium having a second layer.

FIG. 3F shows a top view of an optical recording medium according to an embodiment of the invention.

DETAILED DESCRIPTION OF THE INVENTION

Figure 1:
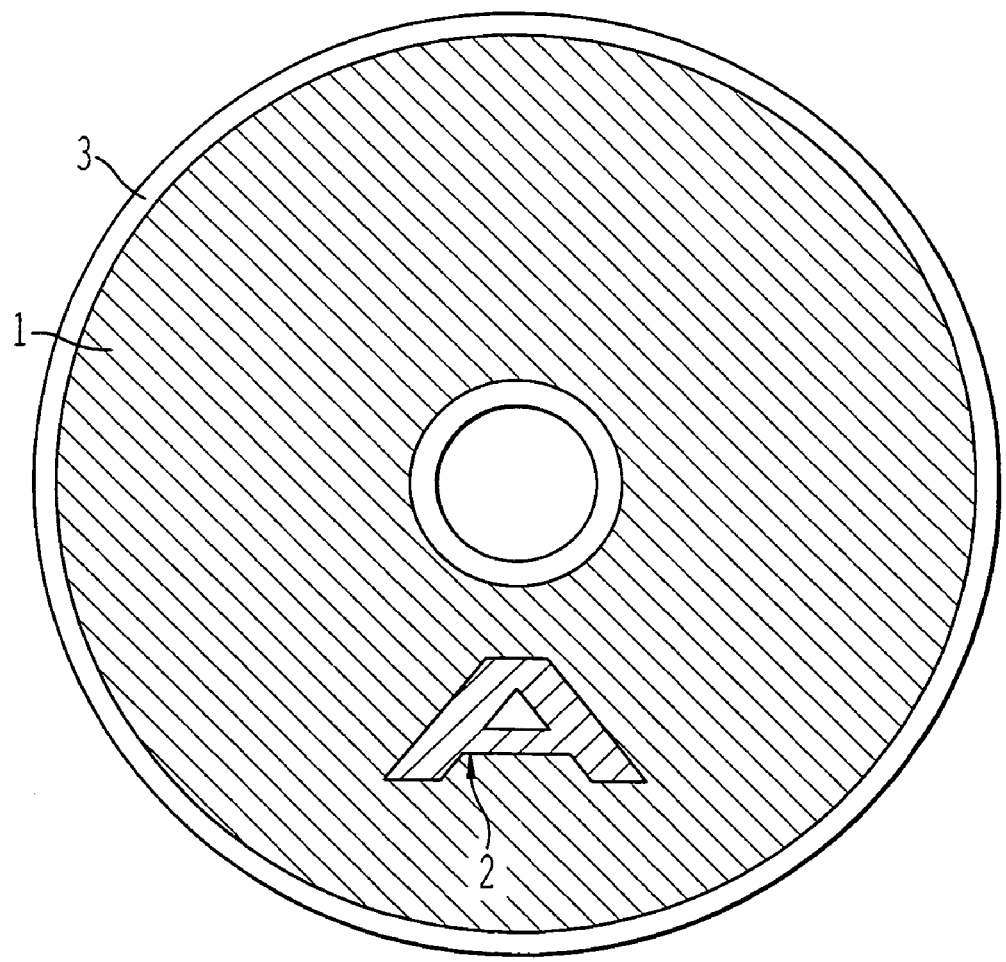
FIG. 1 is a plan view illustrating an optical recording medium which comprises a print-receiving layer as the outermost layer on the side opposite to the light incidence side, wherein a character A is formed on the print-receiving layer as a convex pattern.
Figure 2A:
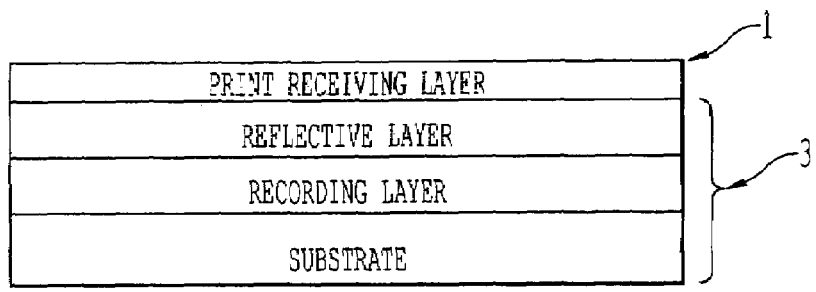
FIG. 2A shows the print-receiving layer present on an optical recording medium.
Figure 2B:
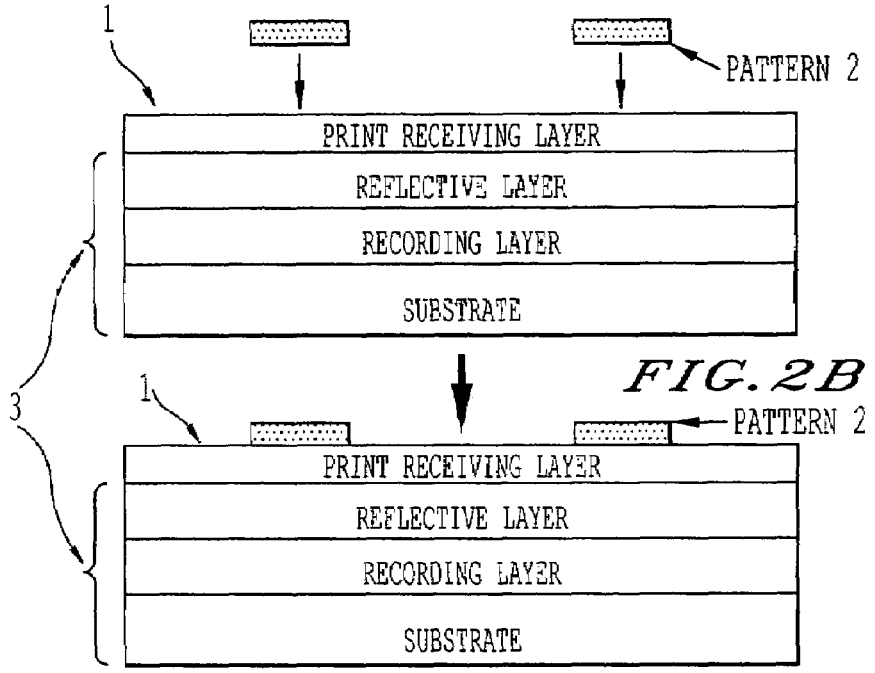
FIG. 2B shows the placement of a pattern on the print-receiving layer.
Figure 2C:
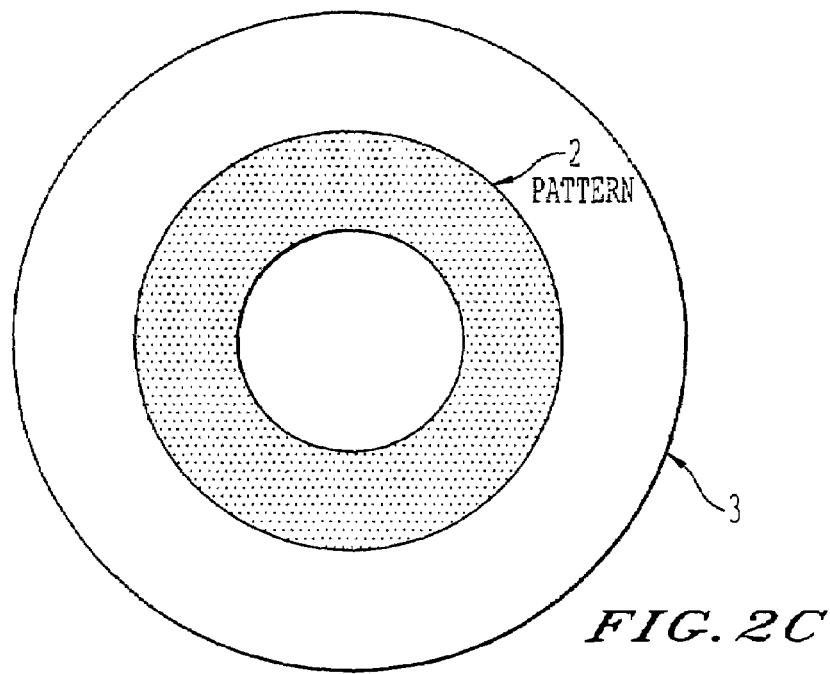
FIG. 2C shows a top view of the optical recording medium.
Figure 4A:
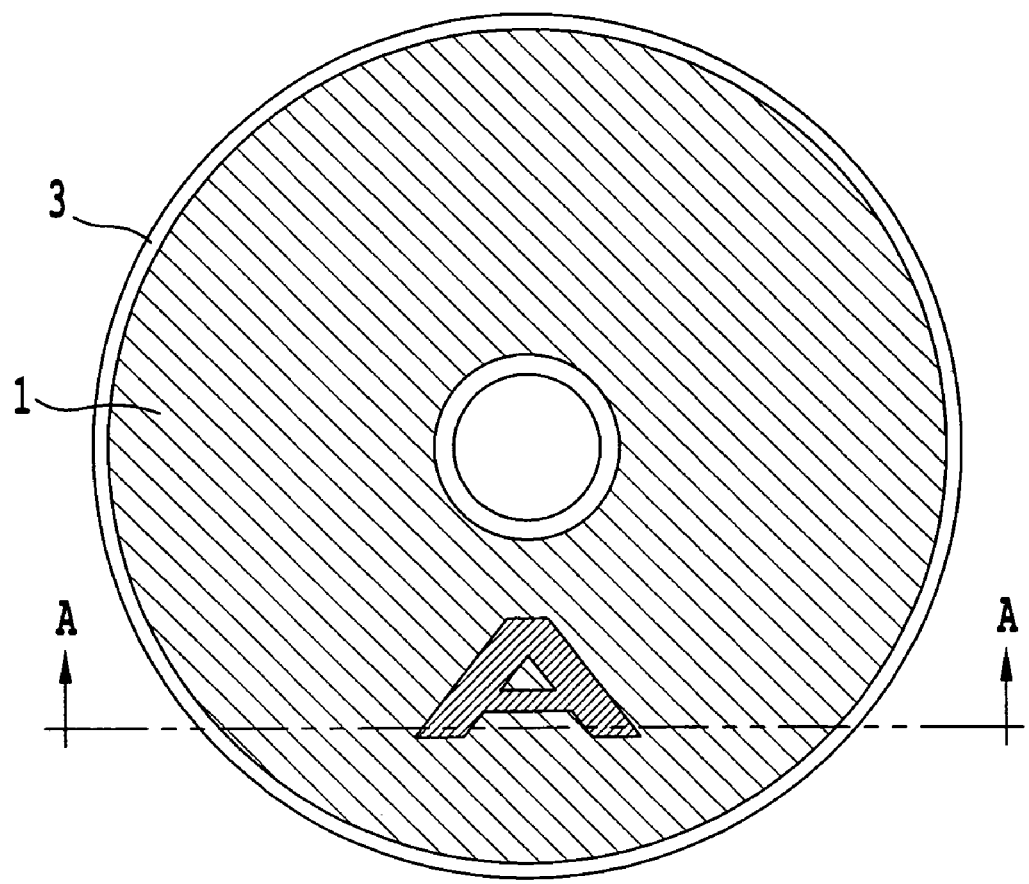
FIG. 4A shows a top view of an embodiment of the invention having a pattern of concaves.
Figure 4B:
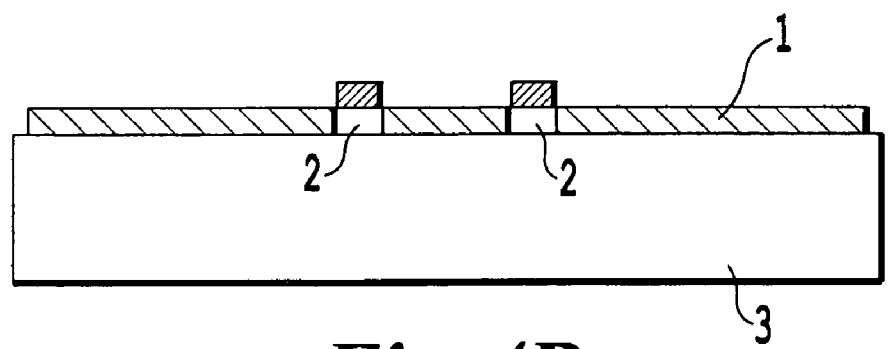
FIG. 4B shows a side view of the embodiment of the invention having a pattern of concaves.
Figure 5A:
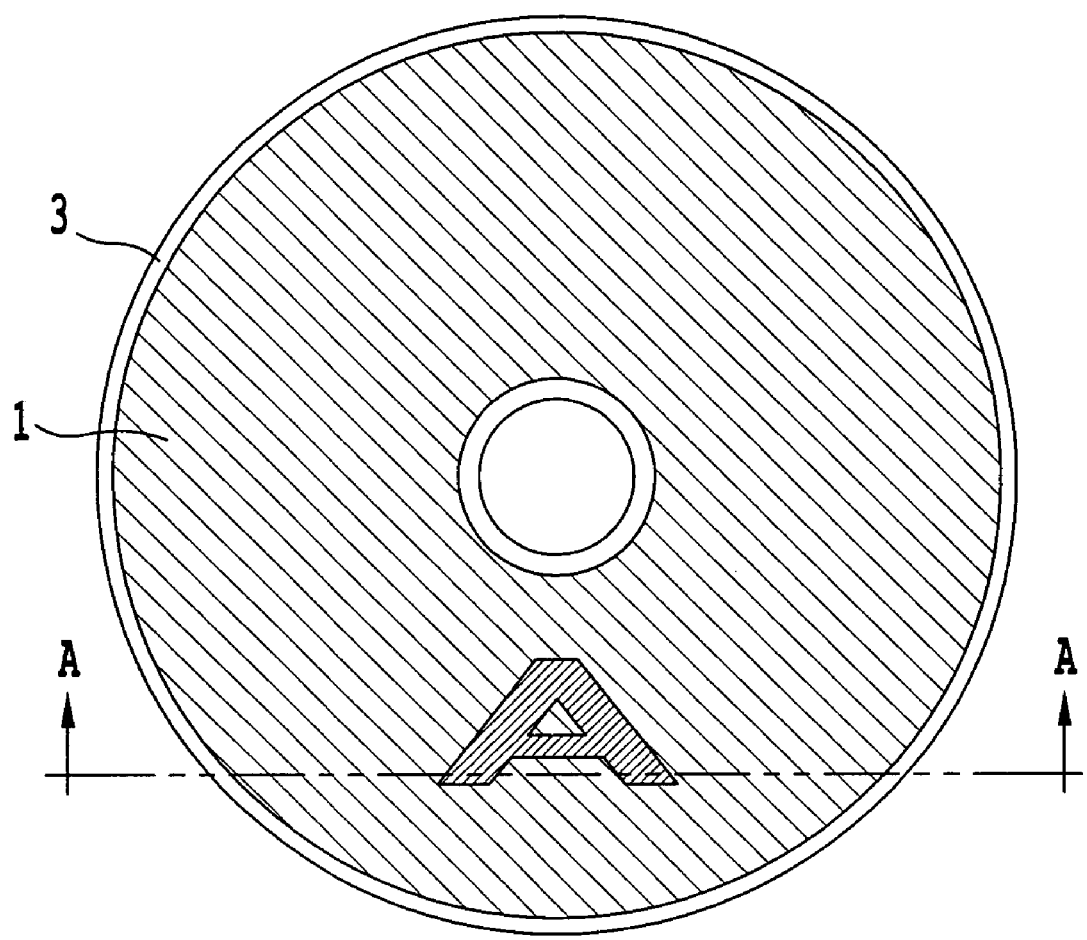
FIG. 5A shows a top view of an embodiment of the invention having a pattern of convexes.
Figure 5B:
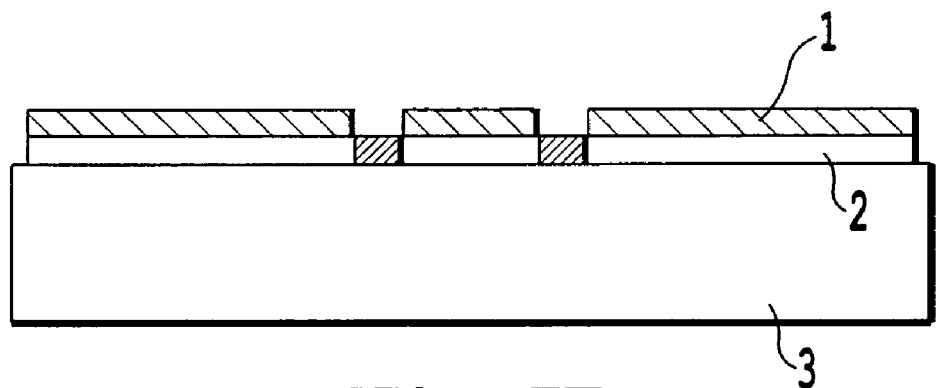
FIG. 5B shows a side view of the embodiment of the invention having a pattern of convexes.

The optical recording medium of the present invention is characterized by that the outermost layer on the side opposite to the light incidence side is a print-receiving layer, and a pattern is formed on the print-receiving layer. The pattern is formed by concaves/convexes or by colors so that a new visual information can further be displayed on said pattern.

The optical recording medium of the present invention has the same structure as a conventional optical recording medium except for the outermost layer on the side opposite to the light incidence side. Namely, it is an optical recording medium comprising a transparent substrate and at least a recording layer on the substrate to reproduce information by irradiating the recording layer with light for regeneration through the transparent substrate, which further comprises a print-receiving layer having a pattern formed thereon as the outermost layer on the recording layer. As is generally known, a reflective layer is usually provided on the recording layer, and accordingly the optical recording medium of the present invention usually has such a structure that the recording layer, the reflective layer and the print-receiving layer are sequentially laminated on the transparent substrate in this order. Between these layers, a subsidiary intermediate layer may further be provided. For example, as is generally known, a subsidiary layer may be provided between the transparent substrate and the recording layer, and a subsidiary layer may be provided also between the recording layer and the reflective layer. Further, a subsidiary layer may be provided also between the reflective layer and the print-receiving layer, as the case requires.

Here, the optical recording medium of the present invention may have such a structure that a recording layer is present between two substrates, such as DVD-Rs and DVD-RW discs. Specifically, a recording layer and a reflective layer are laminated on a transparent substrate, and a protective layer is provided or no protective layer is provided thereon, and then a substrate or a substrate having a recording layer and a reflective layer laminated thereon is further bonded thereto. In the case of such an optical recording medium having a recording layer between two substrates, the print-receiving layer of the present invention may be provided on the substrate on the side opposite to the light incidence side directly or by means of an optional layer.

Further, the optical recording medium of the present invention may have such a structure that the recording layer and the reflective layer are laminated in a direction opposite to the above, i.e. a reflective layer, a recording layer and a protective layer are laminated on a transparent substrate in this order. In this case, the protective layer side is irradiated with laser light for recording and reproduction, and accordingly the print-receiving layer of the present invention is provided on the side opposite to the light incidence side i.e. on the surface of the transparent substrate.

For example, in a case where the print-receiving layer is formed by coating an ultraviolet-curing resin composition containing fine particles and a cation resin as mentioned hereinafter, an ultraviolet-curing resin composition containing no fine particles or cation resin may be coated on the reflective layer to form a subsidiary layer firstly, and then a print-receiving layer may be formed thereon. Further, in the ultraviolet-curing resin composition for formation of the subsidiary layer, an additive such as a dye or a pigment may be incorporated as the case requires. The thickness of the subsidiary layer to be formed between the reflective layer and the print-receiving layer varies depending upon the purpose of formation, but is usually from 2 to 100 µm, preferably from 4 to 50 µm.

As the material for the transparent substrate, a polymeric material such as a polycarbonate resin, an acrylic resin, a polystyrene resin, a vinyl chloride resin, an epoxy resin, a polyester resin or an amorphous polyolefin, or an inorganic material such as glass, may, for example, be used. Particularly preferred is a polycarbonate type resin since it has a high transparency of light and a small optical anisotropy.

On the surface of the transparent substrate, groove information such as guide grooves or pits representing the record address of digital information is usually formed. They are usually formed on the transparent substrate simultaneously when the substrate is prepared by injection molding or casting, but they may be formed by lasing or a 2P method (Photo-Polymer method) after the transparent substrate is prepared.

The recording layer is not particularly limited so long as digital information can be recorded and reproduced by irradiation with laser light, and it may be either a recording layer consisting of an inorganic substance or a recording layer consisting of an organic substance. The thickness of the recording layer is usually from 10 to 5,000 nm.

As the recording layer consisting of an inorganic substance, one consisting of a rare earth transition metal alloy such as Tb.Fe.Co or Dy.Fe—Co and recording information by photothermomagnetic effect may, for example, be used. Further, a recording layer consisting of a chalcogen type alloy such as Ge.Te or Ge.Sb.Te, which undergoes phase change, may also be used.

For a recording layer consisting of an organic substance, an organic dye is mainly used. The organic dye may, for example, be a macrocyclic azaannulene type dye (e.g. phthalocyanine dye, naphthalocyanine dye or porphyrin dye), a polymethylene type dye (cyanine dye, merocyanine dye or squarilium dye), an anthraquinone type dye, an azulenium type dye, a metal-containing azo type dye or a metal-containing indoaniline type dye. Particularly preferred is a metal-containing azo type dye since it is excellent in durability and light resistance.

A pigment-containing recording layer is usually formed by coating a solution containing a dye on a substrate by means of e.g. spin coating, spray coating, dip coating or roll coating. As a solvent, a ketone alcohol solvent such as diacetone alcohol or 3-hydroxy-3-methyl-2-butanone, a cellosolve solvent such as a methyl cellosolve or ethyl cellosolve, an fluoroalkyl alcohol solvent such as tetrafluoropropanol or octafluoropentanol, or an ester solvent such as methyl lactate or methyl isobutyrate, may preferably be used.

A reflective layer is usually formed by e.g. gold, silver or aluminum, but it is preferably formed by silver in the case of a recording layer consisting of an organic dye. To form a reflective layer by such a metal, a deposition method, a sputtering method or an ion plating method may, for example, be employed. Here, a subsidiary layer may be provided between the recording layer and the reflective layer so as to improve adhesion between the recording layer and the reflective layer or to increase the reflectivity. The thickness of the reflective layer is usually from 50 to 200 nm.

The print-receiving layer has a thickness of usually from 5 to 50 µm, and it can be formed by a known material so that it is applicable to a printing method employed when a printing is applied thereto. It is usually preferred to form the print-receiving layer so as to be applicable to printing by an ink-jet printer, particularly a full color ink jet printer, which is one of the most commonly used printing methods. Particularly preferably, the print-receiving layer is formed by an ultraviolet-curing resin composition containing fine particles having an average particle size of at most 200 nm and a cation resin, as disclosed in JP-A-2000-57635. In the print-receiving layer formed by this method, due to presence of the fine particles, fine pores are formed so that an ink is absorbed in the print-receiving layer in a moment by capillarity. Further, since the print-receiving layer can absorb a large amount of an ink, spread (bleeding) of the ink on the surface of the print-receiving layer can be suppressed, and as the rate of absorbing the ink is high, drying characteristics are excellent and a sharp image can be formed.

As the above fine particles, organic or inorganic fine particles are mentioned. Fine particles consisting of an organic substance may, for example, be particles of a synthetic resin such as a polymethyl methacrylate resin, a polystyrene resin, an epoxy resin, a fluororesin, a silicon resin or a polyester resin, or particles of a natural high-molecular compound such as collagen, silk or cotton, and fine particles consisting of an inorganic substance may, for example, be talc or mica, or fine particles of an oxide of a metal such as aluminum, magnesium, zinc, iron, manganese or titanium, or a ceramic. As the fine particles, preferred are fine particles of an inorganic substance in view of e.g. heat resistance, water resistance or solvent resistance, and particularly preferred is a metal oxide, particularly silica, in view of easiness of obtaining fine particles.

When a silica having a large specific surface area is used, fine pores suitable for absorption of the ink can easily be formed in the print-receiving layer, and silica, which is hydrophilic on the surface, well blends with a water base ink. As the silica, one produced by a dry method may be used, but it is preferred to use one produced by a wet method such as sedimentation or gelation, since a porous silica having a large specific surface area can easily be obtained by a wet method.

The size of the fine pores formed in the ink-receiving layer is preferably from several nm to several tens nm in view of effective absorption of the ink. To form such fine pores with a high porosity, the fine particles have to be well dispersed in the ultraviolet-curing resin composition. Further, the average particle size of the fine particles is preferably at most 200 nm to obtain fine pores with a high porosity. Namely, if the average particle size exceeds 200 nm, the pores formed among fine particles tend to be coarse, the absorption power and the absorption rate of the ink tend to decrease, and no adequate ink receptivity may be obtained in some cases. Further, the transmittance of ultraviolet rays tends to decrease, and no adequate photo-curing of the print-receiving layer may be carried out, whereby the inside of the layer is hardly cured, and the productivity tends to be poor. The average particle size of the fine particles is more preferably from 1 to 100 nm, furthermore preferably from 2 to 50 nm. If the average particle size is less than 1 nm, dispersibility in the ultraviolet-curing resin composition tends to decrease, and the pores formed among the particles tend to be too fine, whereby no adequate ink receptivity tends to be obtained.

The blend amount of the fine particles in the ultraviolet-curing resin composition is usually at least 20 wt % and less than 50 wt %, preferably from 30 wt % to 40 wt %. If it is less than 20 wt %, there is a possibility that formation of pores having a size required for ink absorption tends to be difficult.

The cation resin to be contained in the ultraviolet-curing resin composition has a function to make an image to be formed by conducting printing on the print-receiving layer by means of an ink jet printer water-resistant. An anionic water-soluble dye is usually used for an ink for an ink jet printer, and it is considered that when the ink absorbed in fine pores in the print-receiving layer is brought into contact with the cation resin during printing, the dye in the ink reacts with the cation resin and becomes insoluble in water.

The cation resin may be optional one having a cationic moiety in its molecule, and a cation modified product of polyacrylamide, a copolymer of acrylamide with a cationic monomer, a copolymer of a cation modified product of a tertiary amino group-containing (meth)acrylate with another common monomer, or polyallylamine, polyaminesulfone, polyvinylamine, polyethyleneimine, polyamideepichlorohydrin or polyvinylpyridinium halide may, for example, be mentioned. Further, a copolymer of a vinylpyrrolidone type monomer, a vinyloxazolidone type monomer or a vinylimidazole type monomer with another common monomer may be mentioned. Further, a copolymer of a cation modified product of a tertiary amino group-containing (meth)acrylate with another common monomer, represented as a general formula in JP-A-2000-57635, may be mentioned.

As the cation resin, one having a weight average molecular weight of usually from 500 to 200,000, preferably from 1,000 to 100,000, is used. If the weight average molecular weight is too large or too small, the effect to make the image water resistant tends to be small. In the case where the average molecular weight is too small, the reason is considered to be because the cation resin itself dissolves in water or swells. Further, in the case where the average molecular weight is too large, the reason is considered to be because the binding efficiency of the cation resin with the dye molecule tends to decrease due to steric hindrance in molecular structure.

The blend amount of the cation resin in the ultraviolet-curing resin composition is usually at least 1 wt % and less than 40 wt %, preferably at least 3 wt % and less than 15 wt %.

As the ultraviolet-curing resin composition, preferred is a radical reaction type one. This usually contains a monomer component as a polymerization component and a photopolymerization initiator as the main components, and may further contain a resin oligomer component as the polymerization component in some cases.

The resin monomer component may be any monofunctional or multifunctional monomer, but it is preferred to incorporate a multifunctional monomer component in a certain amount so as to increase the crosslinking density in the print-receiving layer and to maintain the strength.

The monofunctional monomer may, for example, be 2-ethylhexyl acrylate, 2-hydroxyethyl acrylate, 2-hydroxypropyl acrylate, phenoxyethyl acrylate, N-vinylpyrrolidone, 2-hydroxyethylacryloylphosphate, tetrahydrofurfuryl acrylate, tetrahydrofurfuryl oxyethyl acrylate or acrylate of ε-caprolactone addition product of 1,3-dioxane alcohol.

The multifunctional monomer component may, for example, be cyclopentenyl acrylate, 1,6-hexanediol diacrylate, diethylene glycol diacrylate, tripropylene glycol diacrylate, 2-(2-hydroxy-1,1-dimethylethyl)-5-hydroxymethyl-5-ethyl-1,3-dioxane diacrylate, trimethylolpropane triacrylate, pentaerythritol triacrylate, dipentaerythritol hexaacrylate, tetraacrylate of propionic acid/dipentaerythritol, or ditrimethylolpropane tetraacrylate.

The resin oligomer component may, for example, be an acrylic type oligomer, an ester type oligomer, a urethane type oligomer or an ether type oligomer. They may be used alone, but when several types of them are combined, a print-receiving layer having various properties can be obtained.

The acrylic type oligomer may, for example, be a polymer of (meth)acrylic acid or an alkyl (meth)acrylate such as methyl (meth)acrylate, ethyl (meth)acrylate, propyl (meth)acrylate or butyl (meth)acrylate, or a copolymer of the above monomer with a compound selected from the group consisting of aromatic vinyl compounds such as styrene, α-methylstyrene and (o,m,p)vinylphenol, vinylcarboxylic acid compounds such as maleic acid, itaconic acid, crotonic acid and fumaric acid, glycidyl group-containing vinyl compounds such as glycidyl(meth)acrylate, allyl glycidyl ether, ethylglycidyl acrylate, crotonylglycidyl ether and glycidyl crotonate, aromatic acrylate compounds such as benzyl (meth)acrylate, substituted alkyl acrylate compounds such as hydroethyl (meth)acrylate and N,N-dimethylaminoethyl (meth)acrylate, acrylamide type compounds such as (meth)acrylamide, N-methylol (meth)acrylamide, N,N-dimethyl (meth)acrylamide and N,N-dimethylaminoethyl (meth)acrylamide, and vinyl acetate, (meth)acrylonitrile, (meth)acrylic chloride and N-(meth)acryloylmorpholine.

The ester type oligomer may, for example, be an ester of acrylic acid with polyester diol composed of a ring-opening polymerized product of phthalic anhydride and propylene oxide, an ester of acrylic acid with polyester diol composed of adipic acid and 1,6-hexanediol, an ester of acrylic acid with a triol composed of a reaction product of trimellitic acid and diethylene glycol, or an ester of acrylic acid with a ring-opening polymerized product of δ-valerolactone.

The urethane type oligomer may, for example, be a reaction product of 2-hydroxyethyl acrylate with a polyurethane composed of hexamethylene diisocyanate and 1,6-hexanediol, or a product obtained by reacting 2-hydroxyethyl acrylate with a diisocyanate oligomer obtained by reacting tolylenediisocyanate with a polyester diol composed of 1,6-hexanediol and adipic acid.

The ether type oligomer may, for example, be an ester of acrylic acid with polypropylene glycol. Further, an epoxy type oligomer obtained by reacting an acrylate with an epoxy resin or a polyarylate may also be used as the resin oligomer component.

The photopolymerization initiator is not particularly limited, and a known photopolymerization initiator such as benzoyl isopropyl ether, benzophenone, 2-hydroxy-2-methylpropiophenone, 1-hydroxycyclohexyl phenyl ketone, 2,4-diethylthioxanthone, methyl o-benzoylbenzoate, 4,4-bisdiethylaminobenzophenone, 2,2-diethoxyacetophenone, benzyl, 2-chlorothioxanthone, diisopropylthiozansone, 9,10-anthraquinone, benzoin, benzoin methyl ether, 2,2-dimethoxy-2-phenylacetophenone, 2-hydroxy-2-methylpropiophenone, 4-isopropyl-2-hydroxy-2-methylpropiophenone or α, α-dimethoxy-α-phenylacetone may be used.

Here, in the ultraviolet-curing composition, a common assistant may be incorporated in addition to the above fine particles and cation resin. The assistant may, for example, be a polymerization terminator, a storage stabilizer, a dispersing agent, an anti-foaming agent or an ultraviolet non-curing resin. To form the print-receiving layer on the reflective layer, it is preferred to coat the ultraviolet-curing resin composition containing the fine particles and the cation resin on the reflective layer by means of a screen printer. In a case of providing a subsidiary layer consisting of an ultraviolet-curing resin between the reflective layer and the print-receiving layer also, a screen printer may be used. For example, as mentioned hereinafter, in a case of forming a concave/convex pattern on the surface of the print-receiving layer by combination of the subsidiary layer and the print-receiving layer, it is preferred that an ultraviolet-curing resin composition for formation of the subsidiary layer is formed on the reflective layer by screen printing so that said resin composition forms a pattern, and then on the subsidiary layer formed as a pattern, an ultraviolet-curing resin composition for formation of the print-receiving layer is formed by screen printing so that the entire surface of the reflective layer is covered. Here, in the case of forming a layer by screen printing, it is preferred to smoothen the surface of the coating layer to be formed, to make bubbles quickly be discharged from the coating layer, and to incorporate a leveling agent such as silicon oil into the ultraviolet-curing resin composition so as to increase gloss of the coating layer.

As an ultraviolet light source for curing the ultraviolet-curing resin composition, a conventional one such as a high pressure mercury lamp or a metal halide lamp may be used. The irradiation energy is usually from 150 to 2,000 mJ/cm$^2$, preferably from 250 to 1,000 mJ/cm$^2$.

In the present invention, a pattern is formed on the print-receiving layer. The pattern may be optional one such as a character, a figure or a symbol, but it has to be visually recognized, i.e. it has to be identified by the naked eye, and when the pattern represents a certain information, the information has to be recognized by the naked eye. Further, the pattern must not be an obstacle when printing is conducted on the print-receiving layer later. Namely, it is required that printing can further be conducted on the pattern so that the printing is recognizable by the naked eye, and it is preferred that after the printing, both visual information by the pattern and visual information displayed by the printing are recognized by the naked eye.

One method of forming such a pattern on the print-receiving layer is to form the pattern by convexes or concaves. In this case, the difference in height of the concave/convex pattern is usually required to be at least 0.1 μm, and preferably at least 0.5 μm. However, if the difference in height of the concave/convex pattern is too large, printing on the pattern tends to be difficult, and accordingly the difference is preferably at most 0.3 mm, particularly preferably at most 0.1 mm. As the method of forming a concave/convex pattern, for example, when the ultraviolet-curing resin composition is coated on the entire surface of the reflective layer to form the print-receiving layer, the ultraviolet-curing resin composition may be coated partially thickly so as to form convexes and the concave/convex pattern is thereby formed. For example, FIG. 1. illustrates an example of the optical recording medium of the present invention obtained in such a manner that a recording layer and a reflective layer are formed on a toroidal transparent substrate 3 with a slight margin left at the periphery, and a print-receiving layer 1 is formed so that the entire surface of the reflective layer is covered, wherein the print-receiving layer is formed thickly at the portion "A" alone so that said portion projects from the surroundings. The pattern is at least one of formed in or formed of the cured resin. The pattern may include concaves and/or convexes. Portion "A" may be a pattern 2 present on the print-receiving layer. The print-receiving layer may be formed thinly at the portion "A" alone so that said portion caves in from the surroundings. Further, as another method, a concave/convex pattern may be formed on the reflective layer by the ultraviolet-curing resin composition for formation of the subsidiary layer, and the ultraviolet-curing resin composition for formation of the print-receiving layer may be coated on the reflective layer so that the entire reflective layer, including the portion having a concave/convex pattern formed thereon, is covered, whereby on the surface of the print-receiving layer, the concave/convex pattern on the subsidiary layer as an inner layer thereof is developed. In this case, the thickness of the print-receiving layer is preferably from 0.5 to 2.0 times the difference in height of the concave/convex pattern on the subsidiary layer. If the difference in height of the concave/convex pattern on the subsidiary layer is too large as compared with the thickness of the print-receiving layer, it tends to be difficult to form the print-receiving layer so that the concave/convex pattern is faithfully reflected. On the other hand, if the thickness of the print-receiving layer is too large as compared with the difference in height of the concave/convex pattern on the subsidiary layer, there is a fear that the concave/convex pattern on the surface of the print-receiving layer becomes unclear.

Another method of forming a pattern on the print-receiving layer is to form a pattern on the print-receiving layer by colors, i.e. to divide the print-receiving layer into several areas by colors (here, the colors represent ones by which a pattern is visually recognizable, such as hue, brightness, chroma saturation, glossiness or texture). This method may be combined with the above method of forming a pattern by concaves or convexes. In the case of forming a pattern on the print-receiving layer by colors, it is preferred to form a pattern by pale colors so that the pattern will not be an obstacle when printing is conducted on the print-receiving layer later. For example, an ultraviolet-curing resin composition for formation of the print-receiving layer is thinly colored by a colorant such as a dye or a pigment, and several colored compositions by different pigments with different color concentrations are prepared, and the print-receiving layer is formed by using them. It is extremely preferred that when printing is conducted on the print-receiving layer thus formed, both the preliminarily formed pattern and the image which is further formed by printing by means of e.g. an ink jet printer are recognizable by the naked eye. Accordingly, the XYZ color system chromaticity coordinate (x,y) of reflected light at an optional portion on the print-receiving layer which has a pattern formed thereon by colors, satisfies the formula (1), more preferably the formula (3):

$$(x-0.32)^2+(y-0.32)^2 \leq 0.015 \quad (1)$$

$$(x-0.32)^2+(y-0.32)^2 \leq 0.010 \quad (3)$$

Further, if the colors are very different at each area in the print-receiving layer, there is a fear that when printing is further conducted on the print-receiving layer, said printing tends to be unclear. Accordingly, colors are preferably homogeneous at each area. Specifically, the XYZ color system chromaticity coordinates $(x_1,y_1)$ and $(x_2,y_2)$ of reflected light at optional two portions on the print-receiving layer satisfies the formula (2), more preferably the formula (4):

$$(x_1-x_2)^2+(y_1-y_2)^2 \leq 0.012 \quad (2)$$

$$(x_1-x_2)^2+(y_1-y_2)^2 \leq 0.010 \quad (4)$$

As the colorant to form a pattern by colors on the print-receiving layer, usually a dye or pigment of e.g. red, green, blue or yellow may be used, and a metal powder, a white pigment or a fluorescent pigment may also be used as the case requires. For example, a white pigment such as titanium oxide may be incorporated in the print-receiving layer so as to whiten the ground color in some cases, and in such cases, a pattern by colors can be formed by using several ultraviolet-curing resin compositions for formation of the print-receiving layer having different blend amounts of the white pigment.

Examples of dyes and pigments to be used for forming a pattern by colors include Victoria Pure Blue (42595), Auramine O (4100), Catilon Brilliant Flavin (basic 13), Rhodamine 6GCP (45160), Rhodamine B (45170), Safranine OK 70:100 (50240), Erio Grawsin X (42080), NO.120/Lionol Yellow (21090), Lionol Yellow GRO (21090), Shimilor First Yellow GRO (21090), Shimilor First Yellow 8GF (21105), Benzidine Yellow 4J-564D (21095), Shimilor First Red 4015 (12355), Lionol Red 7B4401 (15850), Fast Gen Blue JGR-L (74160), Lionol Blue SM (26150), Lionol ES (Pigment Blue 15:6, Pigment Blue 1536), Lionogen Red GD (Pigment Red 168, Pigment Red 108) and Lionol Green 2YS (Pigment Green 36) (the numerals in the above brackets ( ) indicate the color index (C.I.)).

Now, the present invention will be described in further detail with reference to Example. However, it should be understood that the present invention is by no means restricted to such a specific Example.

On a transparent substrate made of polycarbonate having a diameter of 120 mm and having a groove with a depth of 160 nm and a width of 450 nm formed thereon, a metal-containing azo dye is spin-coated (number of revolutions: 500 rpm), followed by drying at 90° C. for 30 minutes to form a recording layer.

Then, on the recording layer, a reflective layer of silver is formed in a thickness of 80 nm by sputtering. On this reflective layer, an ultraviolet-curing resin is spin-coated so that the entire surface of the reflective layer is covered, followed by irradiation with ultraviolet rays for curing, to form a subsidiary layer having a thickness of 5 µm.

Using a composition (A) obtained by incorporating 50 wt % of fine silica particles (primary particle size 10 nm, specific surface area: 250 m$^2$/g) with an ultraviolet-curing resin composition and a composition (B) obtained by further incorporating a colorant with the composition (A), a print-receiving layer having a pattern "CD-R" is formed on the above subsidiary layer. Formation of the print-receiving layer is carried out in such a manner that the composition A is coated on the subsidiary layer by screen printing so that the entire surface of the subsidiary layer except for the "CD-R" portion is covered, and then the composition (B) is coated on the "CD-R" portion by screen printing, followed by irradiation with ultraviolet rays so that the composition (A) and the composition (B) are simultaneously cured.

When printing is conducted on the print-receiving layer thus formed with a water base ink by means of an ink jet printer "CD-Color Printer" manufactured by Fargo, for example, printing can be conducted even on the portion indicating "CD-R" without any problems.

While the invention has been described in detail and with reference to specific embodiments thereof, it will be apparent to one skilled in the art that various changed and modifications can be made therein without departing from the spirit and scope thereof.

This application is based on Japanese patent applications No. 200-127516 filed on Apr. 27, 2000 and No. 2000-189192 filed on Jun. 23, 2000, the entire contents thereof being hereby incorporated by reference.

What is claimed is:

1. An optical recording medium which comprises a print-receiving layer as the outermost layer on the side opposite to a light incidence side, wherein the print-receiving layer has a pattern of concaves, convexes, or a combination thereof, and wherein the print-receiving layer comprises a cured resin and the pattern is at least one of formed in or formed of the cured resin.

2. The optical recording medium according to claim 1, wherein the print-receiving layer is printable with a water base ink by means of an ink jet printer.

3. The optical recording medium according to claim 1, wherein the print-receiving layer contains fine particles having an average particle size of at most 200 nm and a cation resin, and is printable with a water base ink by means of an ink jet printer.

4. The optical recording medium according to claim 1, wherein the difference in height of the concave/convex pattern present in the print-receiving layer is at least 0.1 μm.

5. The optical recording medium according to claim 4, comprising a subsidiary layer in contact with the print-receiving layer, wherein the subsidiary layer has a pattern of concaves, convexes or a combination thereof, and said subsidiary layer pattern is the same as the pattern on the print-receiving layer.

6. The optical recording medium according to claim 1, wherein the print-receiving layer comprises from 30 to 50 wt. % of fine particles of an inorganic substance.

7. The optical recording medium according to claim 1, wherein the print-receiving layer has a pattern of concaves and convexes.

8. The optical recording medium according to claim 1, wherein the print-receiving layer has a pattern of concaves.

9. The optical recording medium according to claim 1, wherein the print-receiving layer has a pattern of convexes.

* * * * *